United States Patent [19]
Tarasuk et al.

[11] 3,941,654
[45] Mar. 2, 1976

[54] TUBULAR FUEL CLUSTER

[75] Inventors: Walter Renald Tarasuk; Isao David Yonemitsu, both of Peterborough, Canada

[73] Assignee: Canadian General Electric Company Limited, Toronto, Canada

[22] Filed: June 4, 1973

[21] Appl. No.: 366,703

Related U.S. Application Data

[63] Continuation-in-part of Ser. No. 216,447, Jan. 10, 1972, abandoned.

[52] U.S. Cl. .................... 176/61; 176/43; 176/78; 176/36 R
[51] Int. Cl. ............................................ G21c 15/02
[58] Field of Search ............. 176/43, 50, 61, 79, 76, 176/78, 31, 32, 36

[56] References Cited
UNITED STATES PATENTS

| | | | |
|---|---|---|---|
| 2,938,845 | 5/1960 | Treshow | 176/78 |
| 2,983,660 | 5/1961 | Loeb et al. | 176/78 |
| 3,180,801 | 4/1965 | Rickert et al. | 176/31 |
| 3,218,237 | 11/1965 | Stoker et al. | 176/78 |
| 3,305,449 | 2/1967 | Furgerson | 176/50 |
| 3,365,372 | 1/1968 | Swanson et al. | 176/79 |
| 3,366,546 | 1/1968 | Anthony et al. | 176/78 |
| 3,368,945 | 2/1968 | Keller et al. | 176/78 |
| 3,378,452 | 4/1968 | Costes | 176/78 |
| 3,389,054 | 6/1968 | Kouocic | 176/32 |
| 3,674,638 | 7/1972 | McGregor | 176/78 |

FOREIGN PATENTS OR APPLICATIONS

| | | | |
|---|---|---|---|
| 1,057,141 | 2/1967 | United Kingdom | 176/78 |

OTHER PUBLICATIONS

Second U.N. Conf. on Peaceful Uses of Atomic Energy, Vol. 6, 1958, pp. 370, 371, 372, by Khristenko et al.

*Primary Examiner*—Harvey E. Behrend
*Attorney, Agent, or Firm*—R. A. Eckersley

[57] ABSTRACT

A core for a nuclear reactor of high specific power output is provided with an arrangement of fuel bundles in which at least some bundles incorporate tubular pencil elements mounted between end plates, having coolant flow restricting means secured to the bundle to control the balance of coolant flow between external flow along the outsides of the pencils and internal coolant flow within the hollow pencils.

4 Claims, 6 Drawing Figures

TUBULAR FUEL CLUSTER

This application is a continuation-in-part of application Ser. No. 216,447 filed Jan. 10, 1972, now abandoned.

This invention is directed to fuel for a nuclear reactor, and in particular to a fuel charge suited for high power output.

In the operation of nuclear reactors the achievement of an economical reactor is tied to many factors, including the factor of fuel burn-up. The achievement of a high rate of burn-up enhances the efficiency of the reactor.

The safe power output from a reactor is associated with the burn-up performance. The thermal efficiency of the reactor is promoted by the provision of the highest possible core temperatures for the largest portion of the core, commensurate with safety considerations.

In the case of liquid cooled nuclear reactors of the CANDU type, as distinct from boiling water reactors in which boiling occurs, the occurrence of coolant phase change must be avoided, yet at the same time the achievement of optimum temperatures in the fuel elements is necessary in order to achieve satisfactory economy of operation. In the case of boiling water reactors it is important that pressure gradients are controlled so that the rate of flashing into steam, and hence the proportion of liquid to vapour in the coolant is controlled along the length of the fuel, so as to avoid sudden phase change in the coolant, with attendant instability.

The present invention includes the provision of fuel bundles having hollow fuel pencils through which coolant may be passed. Owing to enhanced control of maximum temperatures occurring within such bundle pencils, as compared with the more usual solid pencils it is possible to increase the power density of a suitable reactor to a marked extent. The greater control over coolant flows afforded by the bundle structure makes possible the achievement of coolant flows ensuring desired variation of reactivity, relative to the bundle cross-section.

A further feature of the subject invention is the reduction made possible in the number of tubular elements required for a given output, as compared with bundles incorporating solid pencil elements. Thus about one third of the number of tube elements are required, as compared with pencil elements, for similar power rating.

In order to achieve the precise control necessitated in reactor operation the present invention provides means for controlling the distribution of coolant flow relative to individual internal and external surfaces of an element, and for controlling the distribution of coolant flow in relation to the bundle cross-section. Furthermore, the present invention provides graduated pressure drops occurring along the length of a fuel channel, to control the occurrence of the flashing of liquid coolant into vapour.

The present invention thus provides in a nuclear reactor receiving liquid coolant, having a plurality of fuel channels extending in substantially parallel, mutually spaced relation, each channel having an inlet for liquid coolant adjacent one end thereof and an outlet for coolant at the other end wherein one of the channels and the fuel charge therein comprises an elongated cylindrical pressure tube having the coolant inlet and the coolant outlet connected therewith to receive and discharge respectively pressurized coolant, a plurality of mutually adjacent longitudinally extending fuel elements positioned substantially parallel with the longitudinal axis of the channel, including a plurality of apertured flow restriction plate means, each having a pressure-dropping throttle orifice, spaced along the length of the channel in pressure drop controlling relation with the internal coolant paths to provide a progressive controlled pressure drop along the length of the channel, to control flashing of the liquid coolant from a liquid phase to a vapour phase, whereby stabilized coolant flow and high unit power ratings may be achieved.

In the case of booster fuel, the tubular fuel elements are introduced into the core of the reactor by way of a mounting and positioning rod about which the tubular fuel elements are arranged and by means of which the fuel may be selectively introduced at a desired axial location in neutron boosting relation with the reactor fuel charge.

Certain embodiments of the present invention are described, reference being had to the accompanying drawings, wherein.

Figure 1:
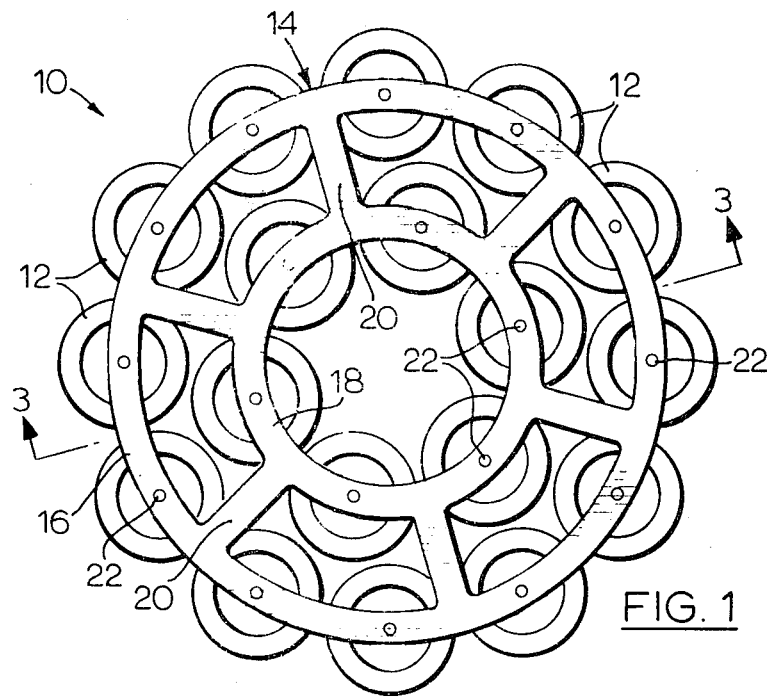
FIG. 1 is an end view of one bundle embodiment having an array of pencil elements.

Referring to FIG. 1, this shows an end view of an 18-element fuel bundle 10, in which the individual tubular elements 12 are mounted between end plates 14. The illustrated form of end plate 14 comprises a pair of coaxial annular rings 16, 18 joined by spokes 20, to form a spider to which the tubular elements are secured by brazing or welding.

Flow control throttle apertures 22 positioned in alignment with the tubular elements 12 control the flow of coolant liquid therethrough. While normally symmetrical it will be understood that the bundles may be asymmetrical, end for end, having an inlet end plate and an outlet end plate each possessing differing flow control characteristics.

Figure 2:
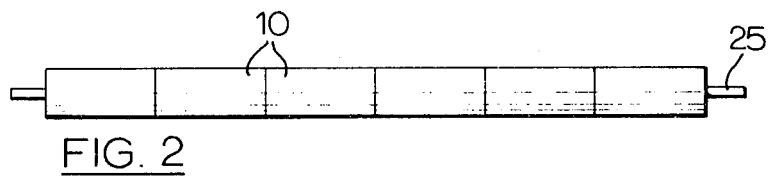
FIG. 2 is a side view of a string of bundles assembled on a rod as a booster fuel assembly.
Figure 6:
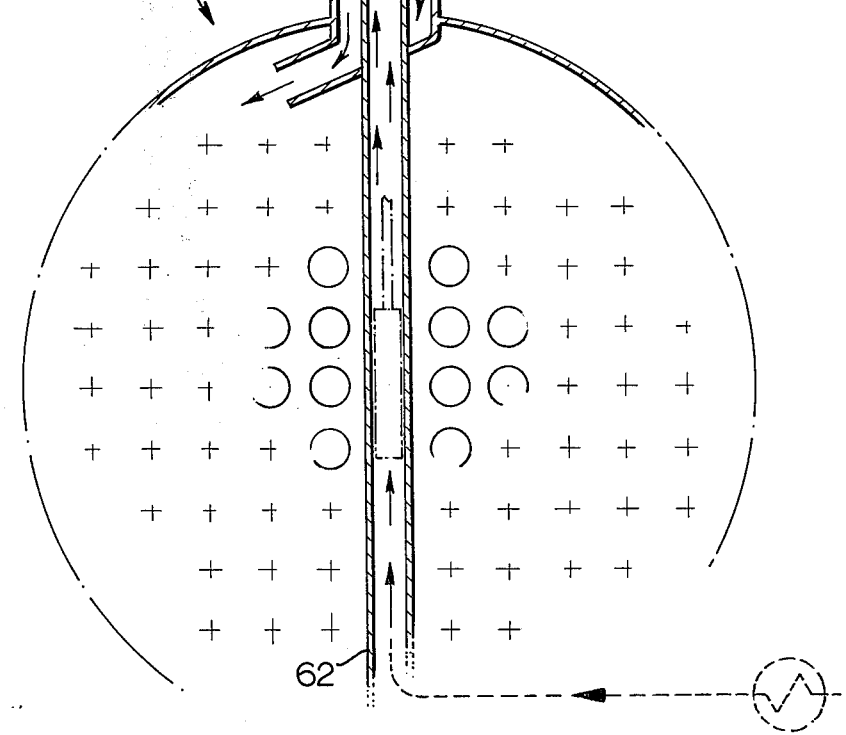
FIG. 6 is a schematic front section of the FIG. 5 embodiment showing a booster assembly incorporating the invention.

FIG. 2 shows an assembly of bundles 10 similar to that of FIG. 1, assembled on a rod 25 for ready insertion into a booster fuel channel of a reactor as shown in FIG. 6. In such an arrangement the adjacent bundles are axially aligned, having corresponding tubular elements in aligned relation to provide a desired coolant flow pattern. As shown in FIG. 6, the booster fuel may be selectively introduced from outside the fuel core to a centralized boosting position.

Figure 5:
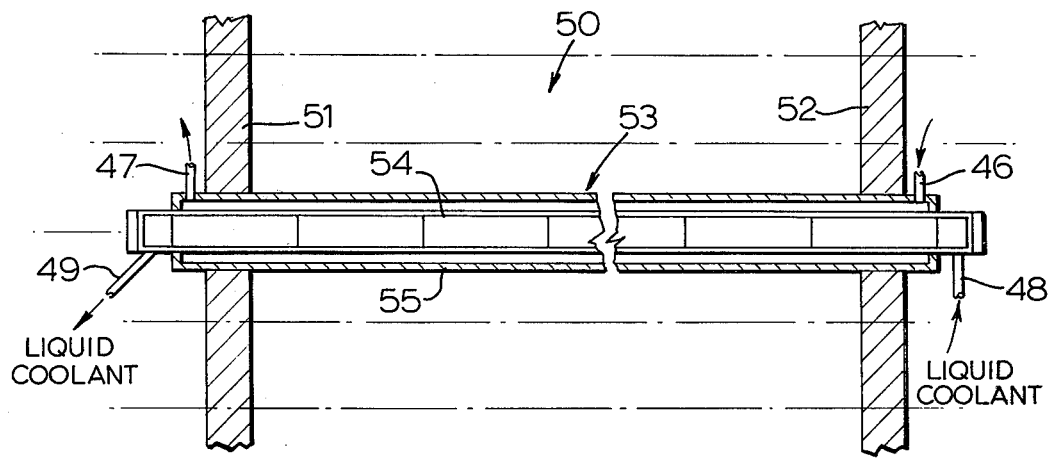
FIG. 5 is a part view in side section of a nuclear reactor incorporating the invention.

Thus, in addition to use with 'natural' uranium oxide fuel, as shown in the FIG. 5 arrangement, also in accordance with the present invention, also is suitable as a rodded arrangement for use as an enriched booster fuel charge, utilizing metal uranium or various alloys of uranium for selective insertion as a fuel charge unit assembly within a reactor as required. Such uranium alloys may be selected from an alloying group of materials including zirconium, aluminum, silicon and carbon (in carbide or mixed graphite form).

Figure 3:
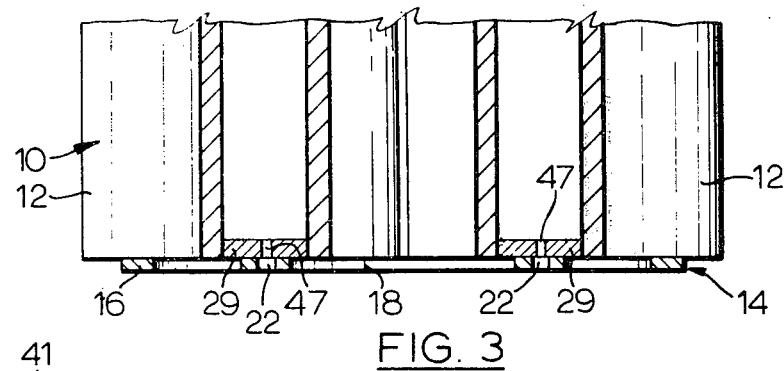
FIG. 3 is a partial section at 3-3 of FIG. 1.

Referring to FIG. 3 it will be seen that the end plate 14 is of uniform thickness, and the provision of a standard throttle aperture 22 extending therethrough may be combined with the throttle aperture 41 of the tube closure plate 29.

Figure 4:
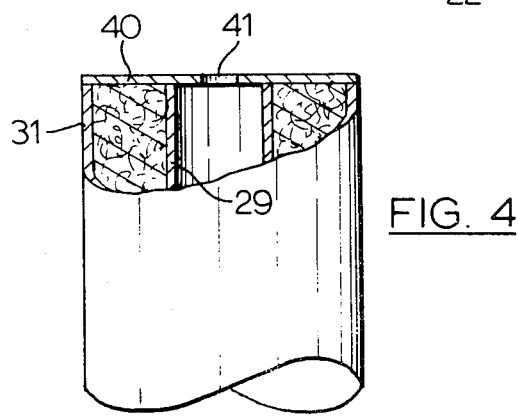
FIG. 4 shows an element incorporating an alternative or supplementary flow control plate.

In the embodiment of FIG. 4 an individual end cap 40 of the tubes 29, 31 is provided with a sized aperture 41 for each inner passage 29 to limit the flow of coolant therethrough to a predetermined rate.

Referring in more detail to FIG. 6, the calandria 60 has a booster channel 62 extending therefrom, and normally including therein the rod 25 carrying a fuel assembly or charge 63 comprising a plurality of short bundles 10 mounted on the rod 25. A pinion 64 positions the rod 25 at a desired position outside the calandria 60 or drives it to an inserted position as shown in phantom. Liquid coolant enters the booster channel 62 at the bottom thereof and flows upwards under pressure past the fuel charge 63, for all fuel locations within the channel 62. An outer channel casing 65 provides a return flow path for the coolant, and also contains a shield plug 66 and a bearing 67 in which the rod 25 slides.

In the case of the portion of fuel charge 50 illustrated in FIG. 5, there are a plurality of fuel channels 53 extending between the ends walls 51, 52 of the calandria. The space within the calandria surrounding the fuel channels 53 contains heavy water, to serve as a neutron moderator. An annular space between the channel outer tube 55 and the pressure tube 54 contains insulant gas which enters at 46 and exits at 47, and serves to reduce the passage of heat from the pressure tubes 55 to the surrounding moderator.

Heavy water coolant entering at 48 passes through the interior of pressure tube 54 and leaves by way of the coolant outlet 49. It is the close and accurate control of the coolant pressure within the fuel channel 53 to which the present invention is particularly directed. By providing a regulated coolant pressure gradient along the length of the channel 53, the occurrence of vaporization pressure can be avoided, and the flashing of liquid coolant into steam can be controlled or eliminated.

The flux gradient across a fuel bundle increases with increase in distance from the axis of the bundle. Accordingly the heat generation rate and the coolant requirement is correspondingly increased. To meet such conditions the adoption of zoned bundle cooling is contemplated, wherein the rate of coolant flow is controlled proportionately with the radial position of the respective tube element within the bundle. Such proportional control may be effected by control of the relative size of the effective coolant flow channel for the related element. In the case of the FIG. 1 embodiment the throttle apertures 22 of the inner ring of tube elements can be made smaller than the corresponding throttle apertures 22 of the outer ring of fuel elements, to provide a grading of coolant flows generally proportional to the variation in flux level across the bundle.

While the control of coolant flow is particularly discussed with relation to throttling control flow of coolant passing through the tubular elements, it will be understood that such interior flow control effectively regulates external flow rates past the element outer surfaces, for a given coolant pressure drop along the length of the fuel channel.

While the subject fuel bundle is illustrated as having end plates 14 securing the individual tubular elements 12 in spaced array, it will be understood that alternative mounting means may be adopted, wherein the structural characteristics of the FIG. 4 element embodiment may be fully utilized, independently of any additional end plates.

Among the available methods of preparing the fuel tubes it is contemplated that the technique of co-extension might be adopted, wherein the zircolloy sheathing and the active filling material are extruded simultaneously in the desired annular form.

What I claim as new and desired to secure by Letters Patent of the United States is:

1. In a liquid cooled nuclear reactor having a plurality of fuel channels extending in substantially parallel mutually spaced relation, each channel having an inlet for liquid coolant adjacent one end thereof and an outlet for liquid coolant adjacent the other end thereof wherein a said channel and the fuel charge therein comprises an elongated cylindrical pressure tube having a said coolant inlet and a said coolant outlet connected therewith to receive and discharge respectively pressurized coolant liquid, a plurality of fuel bundles in abutting end-to-end relation within the channel, each bundle comprising a plurality of substantially mutually parallel longitudinally extending fuel elements positioned substantially parallel with the longitudinal axis of the channel in symmetrical spaced relation to substantially transversely fill the channel, including a plurality of hollow tubular elements each having an axially extending internal coolant flow path extending through the element interior and an external coolant flow path about the element exterior surface, and a plurality of apertured flow restriction plate means secured to the ends of said fuel bundles each plate means having a flow restricting orifice in axially aligned relation with a respective element internal flow path to limit the flow of coolant therethrough, the plates being thus spaced along the length of said channel in flow controlling relation with said internal coolant flow paths to provide in use a progressive, controlled pressure drop between said channel coolant inlet and said channel coolant outlet to substantially preclude flashing of said liquid coolant from a liquid phase to a gaseous phase on passage through the interior of the hollow elements of said fuel charge.

2. The nuclear fuel channel and fuel charge as claimed in claim 1 wherein said fuel bundles are assembled on a longitudinal rod for locating said fuel charge longitudinally within a said channel.

3. The nuclear fuel channel and fuel charge as claimed in claim 1 wherein each said fuel hollow element includes a said element end restriction plate at each end thereof.

4. The nuclear fuel channel and fuel charge as claimed in claim 1 wherein each said fuel bundle includes a pair of end plates at opposite ends of the bundle, each end plate having a plurality of said orifices therethrough in respective aligned relation with said hollow tubular elements to control passage of coolant therethrough.

* * * * *